United States Patent
Takehara et al.

[11] Patent Number: 5,176,399
[45] Date of Patent: Jan. 5, 1993

[54] SUSPENSION APPARATUS OF AUTOMOTIVE VEHICLE

[75] Inventors: Shin Takehara; Mineharu Shibata; Shigefumi Hirabayashi, all of Hiroshima, Japan

[73] Assignee: Mazda Motor Corporation, Hiroshima, Japan

[21] Appl. No.: 711,022

[22] Filed: Jun. 6, 1991

[30] Foreign Application Priority Data

Jun. 7, 1990 [JP] Japan .................. 2-149627

[51] Int. Cl.⁵ ........................... B60G 17/04
[52] U.S. Cl. ................................. 280/707
[58] Field of Search ............ 280/702, 709, 707; 364/424.05

[56] References Cited

U.S. PATENT DOCUMENTS

| | | | |
|---|---|---|---|
| 4,693,485 | 9/1987 | Kamei et al. | 280/707 X |
| 4,865,347 | 9/1989 | Fukushima et al. | 280/707 |
| 4,872,701 | 10/1989 | Akatsu et al. | 280/707 X |
| 5,062,658 | 11/1991 | Majeed | 280/707 |

FOREIGN PATENT DOCUMENTS

| | | | |
|---|---|---|---|
| 426338 | 5/1991 | European Pat. Off. | 280/707 |
| 59-14365 | 4/1984 | Japan . | |
| 289420 | 12/1987 | Japan | 280/707 |
| 63-130418 | 6/1988 | Japan . | |
| 48207 | 2/1990 | Japan | 280/707 |
| 95911 | 4/1990 | Japan | 280/707 |
| 2224247 | 5/1990 | United Kingdom | 280/707 |

Primary Examiner—Tamara L. Graysay
Attorney, Agent, or Firm—Fish & Richardson

[57] ABSTRACT

A fluid cylinder unit is disposed between a vehicle body and each of wheels and suspension characteristics are changed by changing the control amount of operating fluid to be supplied to or discharged from the fluid cylinder. The control amount is given based on predetermined conditions using the traveling state of the vehicle such as vehicle height, velocity of displacing the vehicle height and vertical acceleration as a parameter. A filter causes a gain of the control amount to be reduced as the frequency of vibration gets larger. A time constant of the filter is so set to become larger as the operated control amount gets larger when the control amount is smaller than a predetermined value, while the time constant is set to the predetermined value when the control amount is equal to or larger than the predetermined value. Specifically, the control amount Q is determined by the following formula: $Q = Qc/(1 + k \times Qo \times S)$ (where $Qc$ is a control amount operated; $k$ is a constant; $S$ is a Laplace's operator; and $Qo$ is a time constant set to $Qo = Qc$ when $Qc$ is lower than a predetermined value $W$, and to $W$ when $Qc$ is equal to or larger than the predetermined value $W$.) The filter can prevent oscillation without causing any decrease in sensitivity to control.

27 Claims, 5 Drawing Sheets

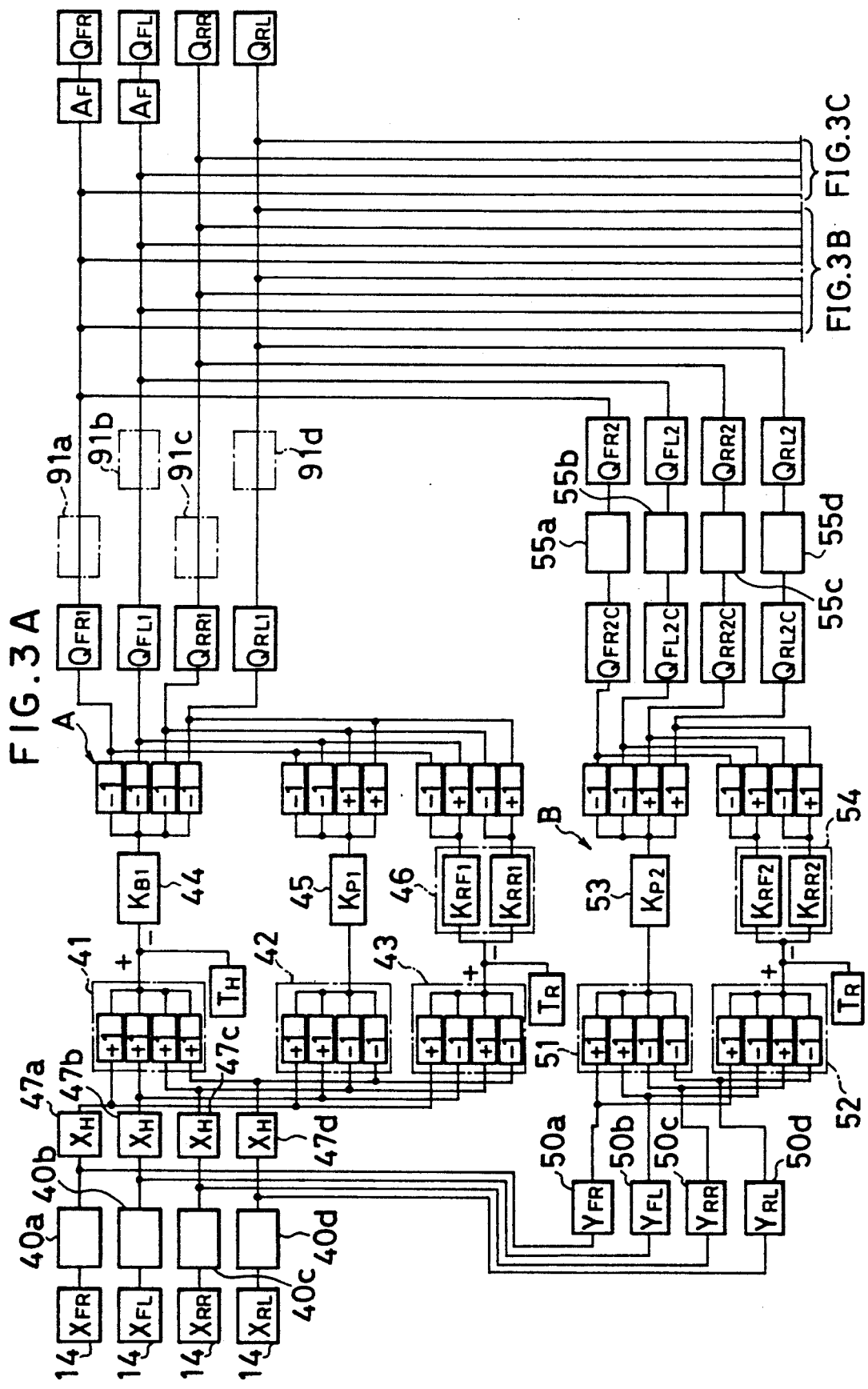

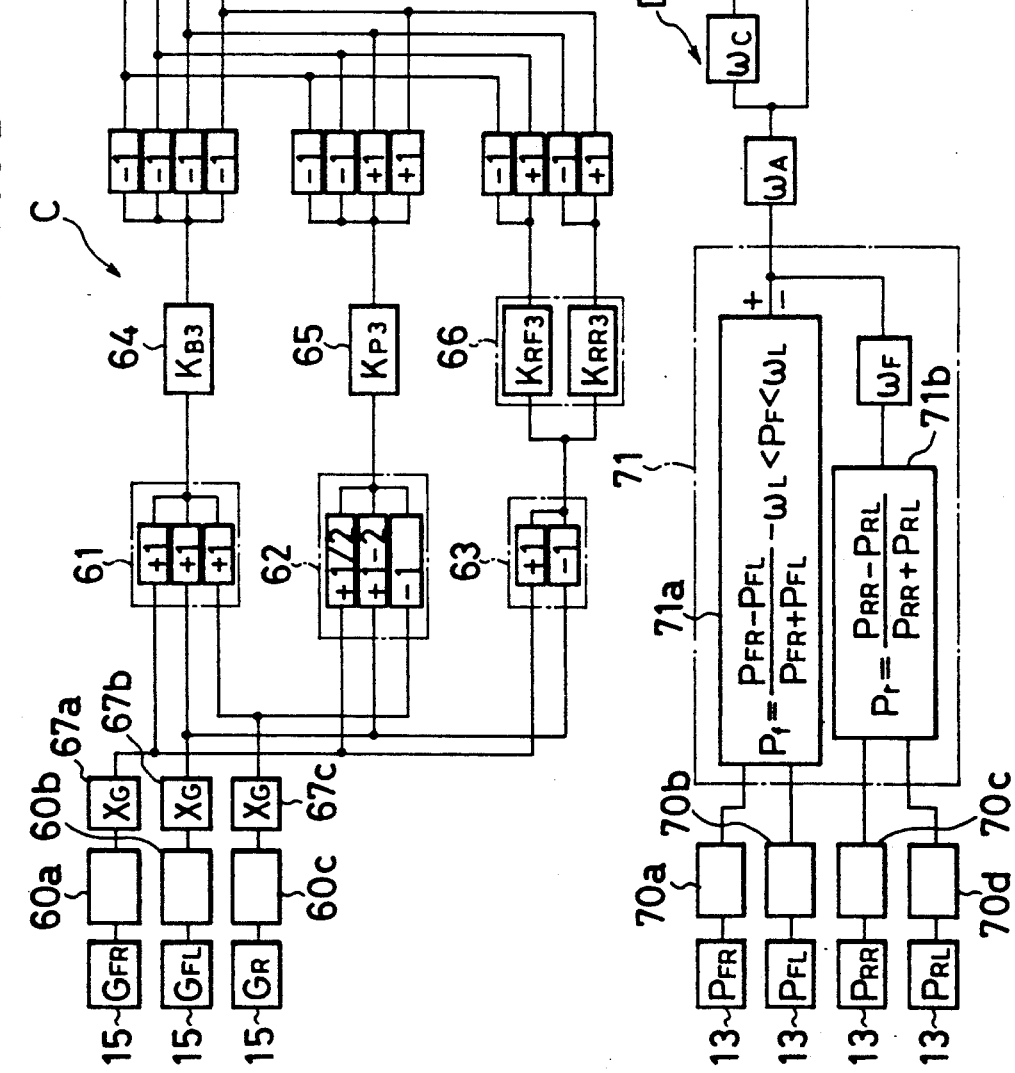

SUSPENSION APPARATUS OF AUTOMOTIVE VEHICLE

BACKGROUND OF THE INVENTION

1. Field of the Invention

The present invention relates to a suspension apparatus of an automotive vehicle and, more particularly, to a suspension apparatus of an automotive vehicle so arranged as to alter its suspension characteristics in a desired manner.

2. Description of Related Art

Heretofore, a suspension apparatus as called a passive suspension comprises a damper unit consisting of a hydraulic damper and a spring such as a coil spring. This passive suspension apparatus is arranged such that the suspension characteristics are set substantially uniform although the damping force of the hydraulic damper is variable yet its range is so small.

On the other hand, there has been proposed a suspension apparatus as called an active suspension having a liquid cylinder unit interposed between a sprung weight and an unsprung weight, which is so arranged as to alter its suspension characteristics in a desired manner by controlling the amount of an operating fluid to be supplied to or discharged from the fluid cylinder unit, as disclosed in, for example, Japanese Patent Publication (kokoku) No. 14,365/1984 and Japanese Patent Laid-open Publication (kokai) No. 130,418/1988.

Generally, the vibration of an automotive vehicle may be divided into three kinds, i.e. bounce, pitch and roll. Such an active suspension has a fluid cylinder unit disposed at each wheel. In order to improve comfort and running stability against such three kinds of vibration, the active suspension is so arranged as to control an opening angle of a flow rate control valve for each wheel by a given control gain so set as to control the quantity of the operating fluid to be supplied to or discharged from the fluid cylinder unit for each wheel in accordance with the running state of the automotive vehicle. Hence, the active suspension is provided with vehicle height controlling means for controlling the vehicle height of the automotive vehicle to reach a target vehicle height and with at least one of vehicle-height displacing speed controlling means for controlling a speed of displacing the vehicle height and acceleration controlling means for reducing vibration of the automotive vehicle body, thereby controlling the opening angle of the flow rate control valve for each wheel by means of each controlling means by operating the quantity of the operating fluid to be supplied to or discharged from the fluid cylinder unit for each wheel in accordance with the desired purposes, adding the values and calculating the quantity of the operating fluid to be supplied to or discharged from the fluid cylinder unit for each wheel.

For the active suspension apparatus, the quantity of the operating fluid to be supplied to or discharged from the fluid cylinder unit is increased when a high-frequency vibration is applied to the automotive vehicle. As a result, there may be the risk of causing an oscillating phenomenon resulting as a matter of course from the control of the active suspension being performed by feedback control and from a delay in response due to a detecting system, a control system, a mechanic system, etc. Hence, it is general that the level of a control signal to an actuator for driving the flow rate control valve for each wheel is so controlled as to be lowered in a region in which the high-frequency vibration is occurring, by inputting an operating signal indicative of the quantity of the operating fluid operated by each controlling means into a flow rate filter having a filter constant as represented by $1/(1+\tau S)$ (where $\tau$ is a time constant and S is a Laplace's operator). In other words, as the Laplace's operator gets larger as a frequency increases, the level of the control signal to be generated to the actuator from the flow rate filter is decreased in the region in which a high-frequency vibration is occurring by inputting the operating signal indicative of the quantity of the operating fluid to be supplied to or discharged from the fluid cylinder unit into the flow rate filter having such a filter constant, thereby preventing the oscillating phenomenon from occurring.

In the active suspension using the flow rate filter having the filter constant as represented by $1/(1+\tau S)$, attempts have been made to prevent the oscillating phenomenon from occurring in the region in which high-frequency vibration occurs, exclusively by means of the Laplace's operator S that increases as the frequency increases because the time constant $\tau$ is a constant. As the oscillating phenomenon is caused to occur when the level of the control signal is caused to be elevated and a speed at which the operating fluid is supplied to or discharged from the fluid cylinder unit becomes great, some active suspensions cannot reduce the level of the control signal to be outputted to the actuator to a sufficiently low level by the flow rate filter when the level of the operating signal indicative of the operated quantity of the operating fluid to be supplied to or discharged from the fluid cylinder unit and the speed of the operating fluid supplied to or discharged from the fluid cylinder unit is high. Hence, they present the problem that the oscillating phenomenon cannot be prevented in a desired way from occurring in the region where the high-frequency vibration occurs.

SUMMARY OF THE INVENTION

Therefore, the present invention has been performed in order to solve the problems and disadvantages inherent in conventional suspension apparatuses and has the object to provide an active suspension apparatus for an automotive vehicle so arranged as to alter suspension characteristics by operating the quantity of the operating fluid to be supplied to or discharged from the fluid cylinder unit, thereby securing a high sensitivity to control and preventing the oscillating phenomenon in the region in which vibration in the high frequency occurs to a highly satisfactory extent.

In order to achieve the object, the present invention consists of a suspension apparatus for an automotive vehicle having a fluid cylinder unit disposed between a vehicle body of the automotive vehicle and each of wheels and having an actuator for supplying or discharging operating fluid to or from the fluid cylinder unit disposed so as to control suspension characteristics, comprising:

travelling-state detecting means for detecting a travelling state of the automotive vehicle;

control means for determining a control amount for the actuator on the basis of a predetermined condition in response to a signal detected by and generated from the travelling-state detecting means; and filter means for decreasing a gain of the control amount determined by the control means in a larger amount as frequency of vibration gets larger; and wherein a time constant of the filter means becomes larger as the control amount gets larger when the control amount determined by the control means is smaller than a predetermined value and the time constant is set to the predetermined value when the control amount determined by the control means is equal to or larger than the predetermined value.

As the filter means, there may specifically be set the one satisfying the following formula:

$$Q = Qc/(1 + k \times Qo \times S)$$

where
Qc is a control amount operated by the control means;
k is a constant;
S is a Laplace's operator so arranged as to become larger as the frequency of vibration gets larger; and
Qo is a time constant (when Qc is lower than a predetermined value W, Qo is set to be equal to Qc, and when Qc is equal to or larger than the predetermined value W, Qo is set to be equal to W).

In accordance with the present invention, the sensitivity to control can be maintained while the oscillation can be prevented to a highly satisfactory extent. In particular, the suspension system according to the present invention is preferred to maintain the sensitivity to control and prevent the oscillation from occurring, when vibration having a large amplitude is applied to the automotive vehicle, in which a low-frequency vibration accompanies a high-frequency vibration.

Other objects, features and disadvantages of the present invention will become apparent during the course of the description of the preferred embodiments, which follows, in conjunction with the accompanying drawings.

BRIEF DESCRIPTION OF THE DRAWINGS

FIGS. 3(A), 3(B) and 3(C) are block diagrams showing a system disposed in the control unit for calculating the quantity of the supplying fluid.

DESCRIPTION OF THE PREFERRED EMBODIMENTS

The present invention will be described more in detail with reference to the accompanying drawings. In the description which follows, reference symbols "F" and "R" denote front and rear, respectively, so that it is to be understood that, for example, wheels 2F and 2R refer to the wheels 2 located on the front (F) and rear (R) sides, respectively. Further, reference symbols "FL", "FR", "RL", and "RR" denote left-hand front, right-hand front, left-hand rear, and right-hand rear, respectively. It is thus to be understood that, for example, the wheel 2FL refers to the wheel 2 on the left-hand front side and the same can be applied to the rest.

Figure 1:
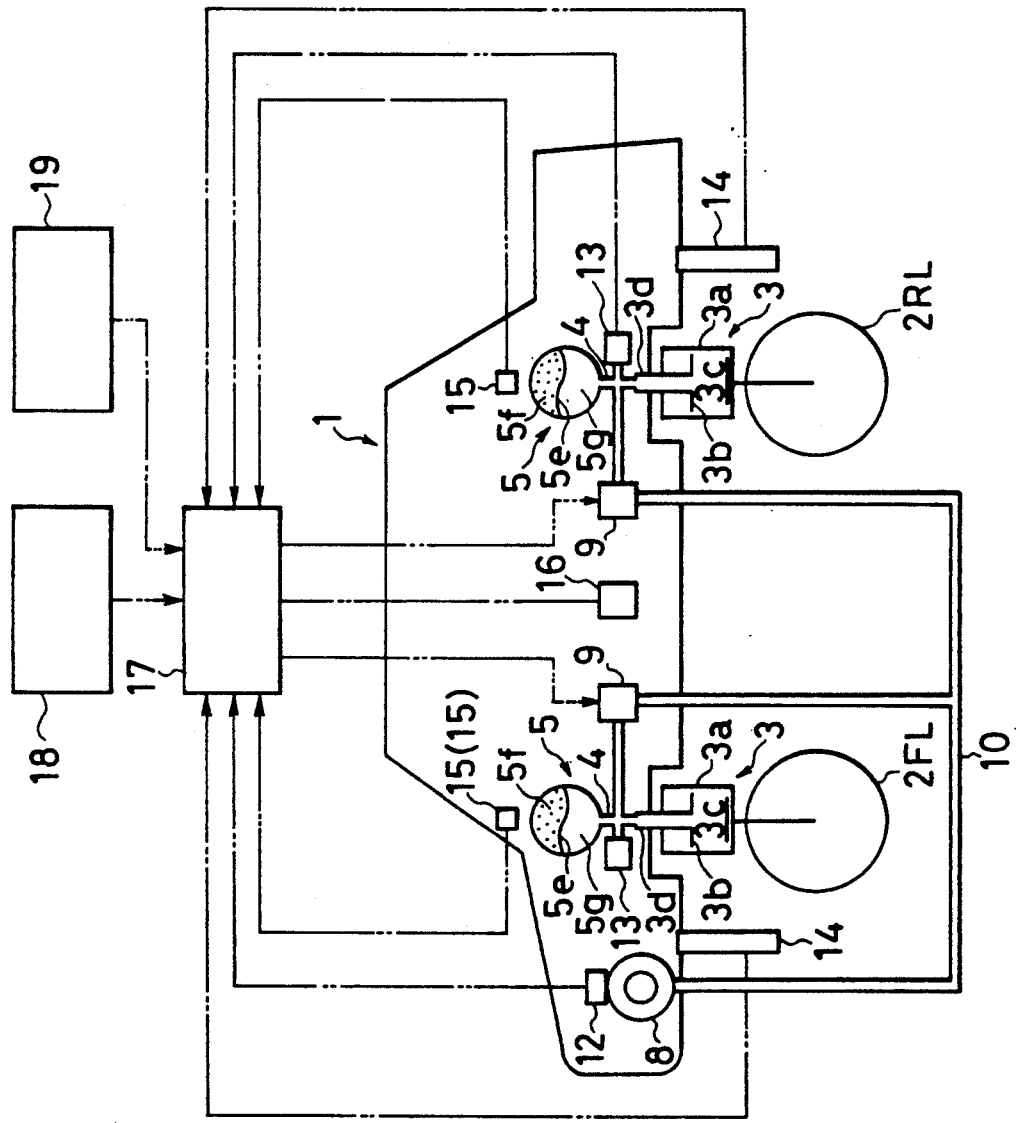
FIG. 1 is a schematic diagram showing an outline of the construction of the suspension apparatus of an automotive vehicle according to the present invention.

FIG. 1 shows an outline of the construction of a suspension apparatus of the automotive vehicle according to the present invention. It is to be noted herein that FIG. 1 indicates only the left side of the vehicle body 1, however, the portion of the vehicle body 1 on the right side has the same structure as the left-hand portion thereof. As shown in FIG. 1, a liquid cylinder unit 3 is interposed between a vehicle body 1 and a left-hand front wheel 2FL and another liquid cylinder unit 3 is interposed between the vehicle body 1 and a left-hand rear wheel 2RL. The liquid cylinder unit 3 comprises a cylinder body 3a connected at its lower end portion to a member on the wheel side and a piston 3b so inserted into the cylinder body 3a as to form and define a liquid pressure chamber 3c within the cylinder body 3a. On an upper face of the piston 3b is provided a piston rod 3d whose upper end portion is supported by the vehicle body 1. Each of the cylinder bodies 3a is connected to the left-hand front wheel 2FL or to the left-hand rear wheel 2RL.

To the liquid pressure chamber 3c of the liquid cylinder unit 3 is communicated a gas spring 5 through a connecting passage 4. The gas spring 5 is divided into a gas chamber 5f and a liquid pressure chamber 5g by a diaphragm 5e, and the liquid pressure chamber 5g is communicated with the liquid pressure 3c of the liquid cylinder unit 3 through the connecting passage 4 and a passage disposed in the piston 3b of the liquid cylinder unit 3.

At the front end portion of the vehicle body 1 is disposed a hydraulic pump 8 driveable by an engine (not shown), and the hydraulic pump 8 is communicated with a liquid pressure pipe 10 having a proportional flow rate control valve 9 which in turn is so arranged as to adjust the flow rate of the operating liquid by controlling the supply or discharge of the operating liquid to or from the liquid cylinder unit 3.

The hydraulic pump 8 is provided with a discharge pressure sensor 12 for sensing the discharge pressure of the hydraulic pump 8 and liquid pressure sensors 13 and 13 for sensing the liquid pressure of the liquid pressure chamber 3c of each liquid pressure 3.

Further, there are disposed vehicle height sensors 14 and 14 for sensing the vertical displacement of the vehicle body with respect to each of the wheels 2FL and 2RL, i.e. the vehicle height displaced at the respective left-hand front and rear wheels 2FL and 2RL, by detecting a cylinder stroke amount of each of the fluid cylinder units. A total of three vertical acceleration sensors 15, 15 and 15 are disposed on a nearly horizontal plane and two of them are mounted in a position above the left-hand front wheel 2FL and the right-hand front wheel 2FR while the remaining one is mounted in a middle position in the widthwise direction of the vehicle body between the left-hand and right-hand rear wheels 2R. A transverse acceleration sensor 16 for sensing a degree of acceleration to be applied in the transverse direction of the vehicle body, a steered angle sensor 18 for sensing the steered angle of the steering wheel, and a vehicle speed sensor 19 for sensing the vehicle speed at which the automotive vehicle is running. The transverse acceleration sensor 16 is disposed at the position of the vehicle body 1 through which gravity passes.

The signals detected by the sensors 12, 13, 13, 14, 14, 15, 15, 15, 16, 18 and 19 are inputted into a control unit 17 having a central processing unit (CPU) and so on. The control unit 17 is so constructed as to perform operation in accordance with a predetermined program on the basis of the signals detected by these sensors and control the proportional flow rate control valves 9 and 9, thereby changing the suspension characteristics in a desired manner.

Figure 2:
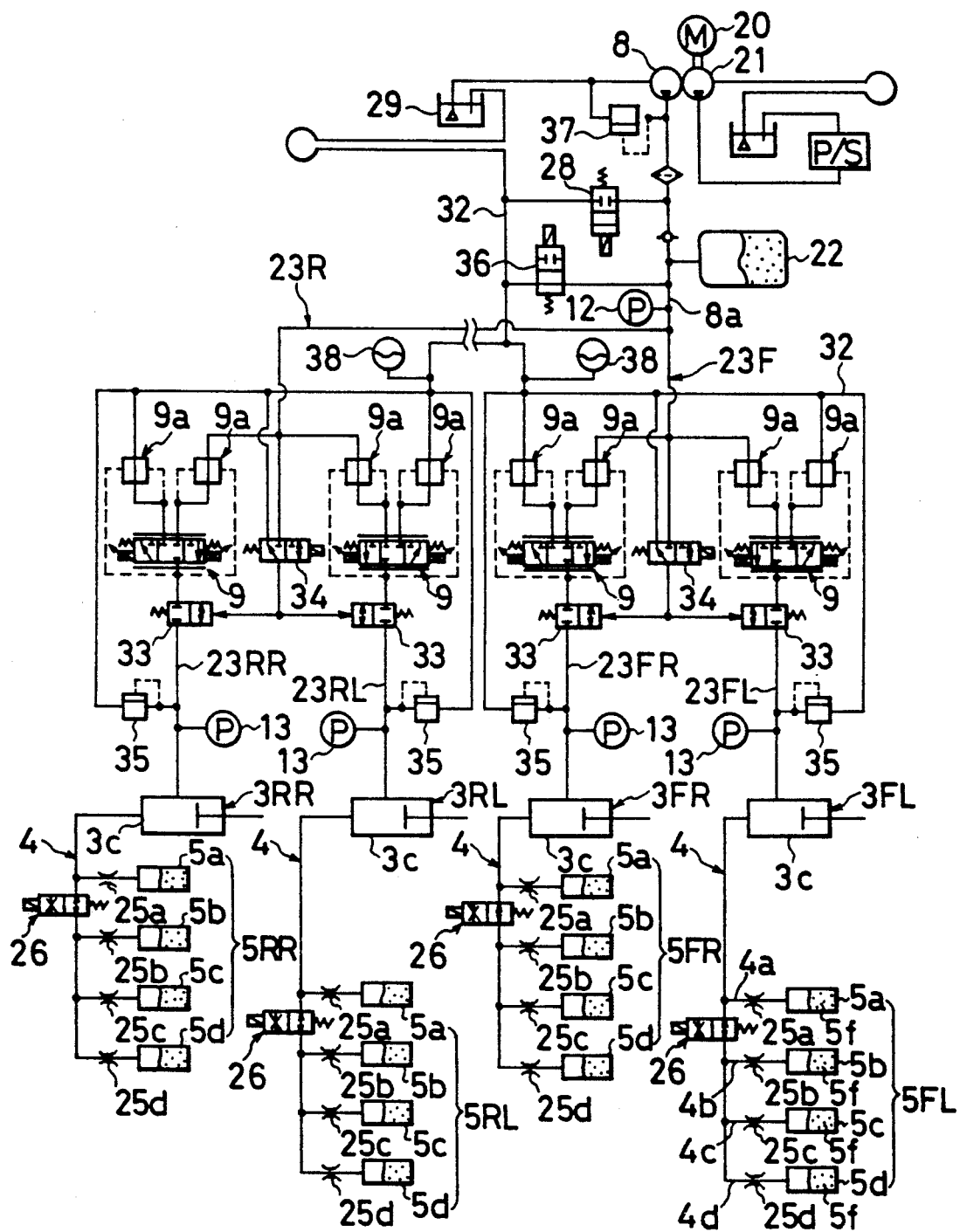
FIG. 2 is a circuit diagram showing a hydraulic pressure circuit for supplying the operating fluid to or discharging it from the fluid cylinder units.

FIG. 2 illustrates the hydraulic pressure circuit for controlling the supply of the operating fluid to the fluid cylinder unit 3 from the hydraulic pump 8 or the discharge thereof from the fluid cylinder unit 3.

As shown in FIG. 2, the hydraulic pump 8 is connected in a position parallel to a hydraulic pump 21 for a power steering apparatus to be drivable by a power plant 20. To a discharge tube 8a for discharging the fluid to the fluid cylinder unit 3 from the hydraulic pump 21 is communicated an accumulator 22 and the discharge tube 8a in turn is branched at a portion downstream of the connection portion of the accumulator 22 into a pipe 23F on the front wheel side and a pipe 23R on the rear wheel side. The pipe 23F on the front wheel side is further divided on the side downstream of the branch portion from the pipe 23R on the rear wheel side into a left-hand branch pipe 23FL on the left-hand front wheel side and a right-hand branch pipe 23FR on the right-hand front wheel side. The left-hand branch pipe 23FL is communicated with the liquid pressure chamber 3c of the corresponding liquid cylinder unit 3FL and the right-hand branch pipe 23FR is communicated with the liquid pressure chamber 3c of the corresponding liquid cylinder unit 3FR. Likewise, the pipe 23R is branched on the side downstream of the branch portion into a left-hand branch pipe 23RL on the left-hand rear wheel side and a right-hand branch pipe 23RR on the right-hand rear wheel side. The left-hand branch pipe 23RL on the left-hand rear wheel side is communicated with the liquid pressure chamber 3c of the corresponding liquid cylinder unit 3RL while the right-hand branch pipe 23RR on the right-hand rear wheel side is communicated with the liquid pressure chamber 3c of the corresponding liquid cylinder unit 3RR.

Each of the gas springs 5FL, 5FR, 5RL, and 5RR connected to the corresponding liquid cylinder units 3FL, 3FR, 3RL, and 3RR has four gas spring members 5a, 5b, 5c and 5d. Each of the gas spring members 5a is then connected to the corresponding connecting passage 4 through a branched connecting passage 4a branched from the connecting passage 4. Each of the gas spring members 5b is likewise connected to the corresponding connecting passage 4 through a branched connecting passage 4b which is further branched from the connecting passage 4. Further, each of the gas spring members 5c is connected first to a branched connecting passage 4c and then to the corresponding connecting passage 4, the branch connecting passage 4c being branched from the connecting passage 4, while each of the gas spring members 4d is likewise connected to the connecting passage 4 through a branched connecting passage 4d branched therefrom. The branched connecting passages 4a, 4b, 4c and 4d of the respective gas spring members 5a, 5b, 5c and 5d are provided with orifices 25a, 25b, 25c and 25d, respectively. The basic functions of the suspension apparatus are achieved by the damping action of each of the orifices 25a, 25b, 25c and 25d and the buffer action of the gas filled in the gas chamber 5f of each of the gas spring members 5a, 5b, 5c and 5d, thereby reducing the high-frequency vibration to be applied to the vehicle body.

The connecting passage 4 extending between the first gas spring member 5a disposed in the position closest to each of the springs 5FL, 5FR, 5RL, and 5RR and the second gas spring member 5b disposed in the position adjacent the first gas spring member 5a is provided with a damping-force shifting valve 26 for shifting the damping force by adjusting the passage area of the connecting passage 4. The damping-force shifting valve 26 is so arranged as to assume two positions which include an open position in which the connecting passage 4 is opened and a contracted position for contracting or reducing the passage area of the connecting passage 4. FIG. 2 indicates the state in which the shifting valve 26 assumes the open position.

To the discharge tube 8a of the hydraulic pump 8 in the vicinity on the upstream side of the connection portion of the accumulator 22 has an unload relief valve 28. The unload relief valve 28 is so constructed as to be shifted to its open position to thereby return the liquid discharged from the hydraulic pump 8 directly to a reserve tank 29 when the discharging pressure of the operating liquid measured by the discharge pressure gauge 12 is equal to or higher than an upper limit value, e.g. 160 kgf/cm$^2$, on the one hand, while it is shifted to its closed position to thereby supply the liquid to the accumulator 22 and retain the pressure-accumulating value of the hydraulic pressure of the accumulator 22 at a predetermined value when the discharge pressure thereof is lower than a predetermined lower limit value, e.g. 120 kgf/cm$^2$, on the other hand. This allows the operating liquid to be supplied to each of the liquid cylinder unit 3 in accordance with the pressure-accumulating force of the accumulator 22 retained at the predetermined pressure-accumulating value. FIG. 2 indicates the state in which the unload relief valve 28 assumes its closed position.

The hydraulic pressure circuit of the liquid cylinder unit 3 disposed to each of the wheels has the same construction, so that description which follows will be made of the hydraulic pressure circuit for the left-hand front wheel 2FL only and description of the others will be omitted herefrom for brevity of explanation.

The proportional flow rate control valve 9 disposed on the left-hand pipe 23FL on the left-hand front wheel side is composed of a three-way valve which is so constructed as to assume three positions: a closed position as shown in FIG. 2 for closing all ports, a supply position for opening the left-hand pipe 23FL so as to supply the hydraulic pressure, and a discharge position for communicating the left-hand pipe 23FL on the left-hand front wheel side with a return passage 32. FIG. 2 indicates the state in which the proportional flow rate control valve 9 assumes its closed position. Further, the proportional flow rate control valve 9 has a pair of pressure compensation valves 9a and 9a which in turn are so disposed as to retain the liquid pressure of the liquid cylinder unit 3 to a predetermined value when the proportional flow rate control valve 9 is located in the supply position or in the discharge position.

The proportional flow rate control valve 9 is provided on the side of the fluid cylinder unit 3 with an opening/closing valve 33 of a type capable of opening or closing the left-hand pipe 23FL on the left-hand front wheel side in accordance with a pilot pressure. The opening/closing valve 33 allows the liquid pressure of an electromagnetic valve 34 to be introduced as the pilot pressure at the time when the electro-magnetic valve 34 is opened so as to lead the liquid pressure of the left-hand front wheel pipe 23FL on the side of the hydraulic pressure pump 8 of the proportional flow rate control valve 9. The opening/closing valve 33 allows the proportional flow rate control valve 9 to control the supply or discharge of the operating liquid to or from the liquid cylinder unit 3 by opening the left-hand pipe 23FL on the front wheel side when the pilot pressure is equal to or higher than a predetermined value.

As shown in FIG. 2, reference numeral 35 denotes a relief valve for returning the operating liquid within the liquid pressure chamber 3c to the return passage 32 by opening it when the liquid pressure within the liquid pressure chamber 3c of the liquid cylinder unit 3 is elevated to an abnormal extent. Reference numeral 36 denotes a valve associated with an ignition key connected to the discharge tube 8a of the hydraulic pump 8 in the vicinity on the side downstream of the connection portion of the accumulator 22. This valve 36 is so arranged as to return the operating liquid accumulated within the accumulator 22 by opening the valve 23 when the ignition key is turned off, thereby releasing such a high pressure state. Reference numeral 37 denotes a pump relief valve for decreasing the discharge pressure by returning the discharged liquid within the hydraulic pressure pump 8 to the reserve tank 29 when the discharge pressure of the hydraulic pump 8 is elevated to an abnormal extent. Reference numeral 38 denotes a return accumulator disposed at the return passage 32 for accumulating the pressure when the operating liquid is discharged from the liquid cylinder unit 3.

Figure 3C:
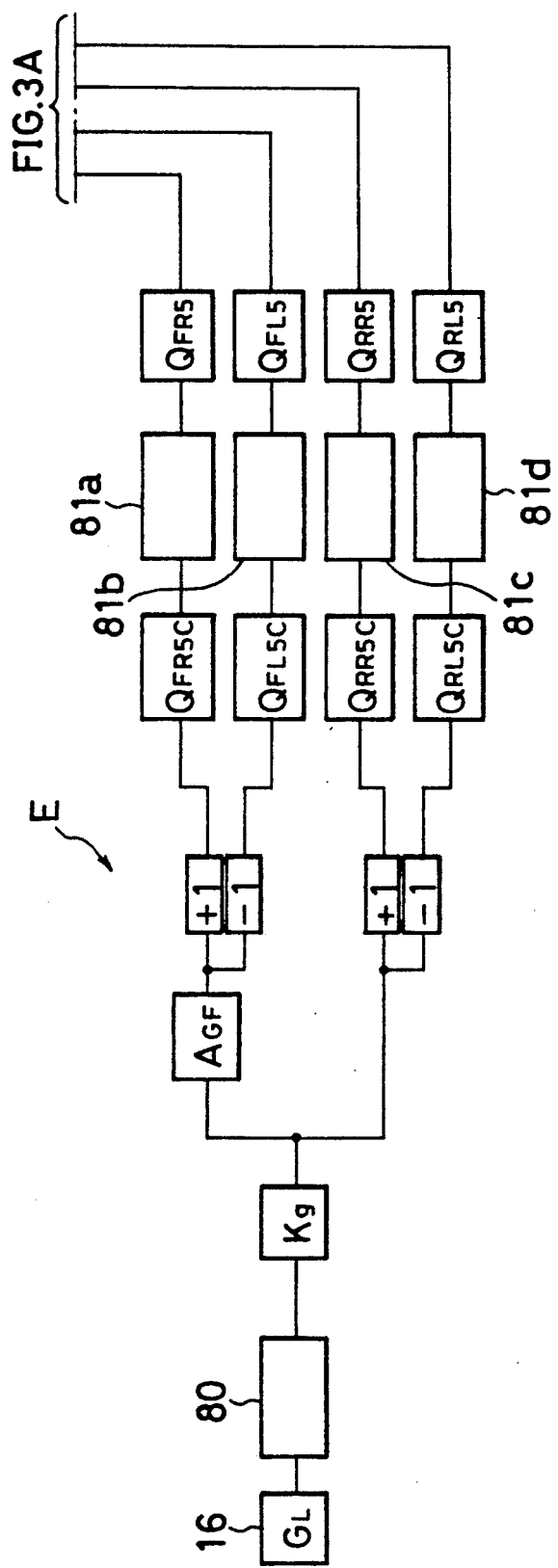

FIGS. 3(A), 3(B) and 3(C) are block diagrams showing a system disposed within the control unit 17 for calculating the amounts for controlling the fluid.

A fluid control amount calculating unit 100 for calculating an amount for controlling the fluid comprises a vehicle height control system A for controlling the vehicle height of the vehicle body, a vehicle-height displacement velocity control system B for controlling the displacement of the vehicle height of the vehicle body, a vertical vibration control system C for reducing vibration of the vehicle body in the vertical direction, a vehicle body twist control system D for suppressing a twist of the vehicle body, and a transverse acceleration control system E for decreasing vibration thereof in the transverse direction. The vehicle height control system A is to control the displacement of the vehicle height of the vehicle body to a target vehicle height on the basis of signals XFL, XFR, XRL, and XRR, indicative of the vehicle heights at the respective wheels, detected by and outputted from the vehicle height sensors 14, 14, 14 and 14, respectively. The vehicle-height displacement velocity control system B is to control the velocity at which the vehicle height of the vehicle body displaces, on the basis of signals YFL, YFR, YRL, and YRR, indicative of the velocity of displacing the vehicle body, obtained by differentiating the signals XFL, XFR, XRL, and XRR, respectively. The vertical vibration control system C is to reduce the vibration of the vehicle body in the vertical direction on the basis of signals GFR, GRL, and GR, indicative of acceleration in the vertical direction of the vehicle body, or in vertical acceleration, detected by and outputted from the respective vertical acceleration sensors 15, 15 and 15. The vehicle body twist control system D is to eliminate a twist of the vehicle body by operating the twist thereof on the basis of signals PFL, PFR, PRL, and PRR, indicative of the liquid pressure, detected by and outputted from the respective liquid pressure sensors 13, 13, 13 and 13 of the liquid cylinders 3. The transverse acceleration control system E is to reduce the vibration in the transverse direction of the vehicle body on the basis of signal GL, indicative of transverse acceleration, detected by the transverse acceleration sensor 16.

The vehicle height control system A is provided with low pass filters 40a, 40b, 40c and 40d for cutting the high-frequency components out of the vehicle height displacement signals XFL, XFR, XRL and XRR detected by the vehicle height sensors 14, 14, 14 and 14 for the respective wheels in order to cut noises out of those signals. In other words, the low pass filters 40a and 40b cut the high-frequency components out of the vehicle height displacement signals XFL and XFR outputted from the vehicle height sensors 14 and 14 located at the respective left-hand and right-hand front wheels 2FL and 2FR, while the low pass filters 40c and 40d cut the high-frequency components out of the vehicle height displacement signals XRL and XRR outputted from the vehicle height sensors 14 and 14 located at the respective left-hand and right-hand rear wheels 2RL and 2RR.

The vehicle height control system A comprises a bounce component operating section 41, a pitch component operating section 42, and a roll component operating section 43. The bounce component operating section 41 is to give a bounce component of the vehicle body by adding the sum of the signals XFL and XFR from which the high-frequency components have been removed, i.e., XFL+XFR, to the sum of the signals XRL and XRR from which the high-frequency components have been removed, i.e., XRL+XRR. The pitch component operating section 42 is to operate a pitch component of the vehicle body by subtracting the sum of the signals XRL and XRR on the rear wheel sides, i.e. XRL+XRR, from the signals XFL and XFR on the front wheel sides, i.e. XFL+XFR. The roll component operating section 43 is to operate a roll component of the vehicle body by adding the difference of the signals XFL and XFR on the rear wheel sides, i.e. XRL−XRR, to the difference of the signals XRL and XRR on the front wheel sides, i.e. XFL−XFL.

The vehicle height control system A comprises a bounce control section 44, a pitch control section 45, and a roll control section 46. The bounce control section 44 is provided with the bounce components of the vehicle body given by the bounce component operating section 41 and a target average vehicle height TH and it operates a control amount of fluid to be supplied to the fluid cylinder unit 3 for each wheel for controlling the bounce component on the basis of a gain KB1. The pitch control section 45 is provided with the pitch components of the vehicle body given by the pitch component operating section 42 and it operates a control amount of fluid to be supplied to the fluid cylinder unit 3 for each wheel for controlling the pitch component on the basis of a gain KP1. The roll components given by the roll component operating section 43 and a target roll displacement amount TR are inputted into the roll control section 46 for giving a control amount of the fluid to be supplied to the fluid cylinder unit 3 for each wheel on the basis of gains KRF1 and KRR1 for controlling the roll components so as to correspond to the target roll displacement amount TR.

The sign plus or minus of each of the control amounts given for each wheel by the respective bounce control section 44, the pitch control section 45 and the roll control section 46 is inverted into the opposite sign. In other words, each of the vehicle height displacement signals XFR, XFL, XRR and XRL detected by the vehicle height sensors 14, 14, 14 and 14 are processed so as to reverse their signs to the signs opposite to the signs detected thereby. Thereafter, the bounce, pitch and roll components for each wheel are added to each other, thereby giving control signals QFL1, QFR1, QRL1, and QRR1 for controlling the amount of fluid to be supplied to the proportional flow rate control valve 9 for each wheel.

Blind section units 47a, 47b, 47c and 47d are interposed, respectively, between the low pass filter 40a as well as the bounce, pitch and roll operating sections 41, 42 and 43, between the low pass filter 40b as well as the bounce, pitch and roll operating sections, between the low pass filter 40c as well as the bounce, pitch and roll operating sections, and between the low pass filter 40d as well as the bounce, pitch and roll operating sections. The vehicle height displacement signals XFR, XFL, XRR and XRL inputted through the low pass filters 40a, 40b, 40c and 40d from the vehicle height sensors 14, 14, 14 and 14 are so arranged as to be fed to each of the bounce component operating section 41, the pitch component operating section 42 and the roll component operating section 43, only when the vehicle height displacement signals XFR, XFL, XRR and XRL have passed through the blind sections XH, XH, XH and XH, respectively.

The vehicle-height displacement velocity control system B comprises differentiators 50a, 50b, 50c and 50d for differentiating the vehicle height displacement signals XFR, XFL, XRR and XRL which have been inputted from the vehicle height sensors 14, 14, 14 and 14 and from which the high-frequency components are removed by the low pass filters 40a, 40b, 40c and 40d and by operating the vehicle height displacement velocity signals YFR, YFL, YRR and YRL according to the following formula:

$$Y = (Xn - Xn-1)/T$$

where
Xn is an amount of displacing the vehicle height at the time t;
Xn−1 is an amount of displacing the vehicle height at the time t-1; and
T is a sampling time.

The vehicle-height displacement velocity control system B comprises a pitch component operating section 51 and a roll component operating section 52. The pitch component operating section 51 is to operate the pitch component of the vehicle body by subtracting the sum of the vehicle-height displacement velocity signals YRL and YRR on the side of the left-hand and right-hand rear wheels 2RL and 2RR, i.e. YRL+YRR, from the sum of the vehicle-height displacement velocity signals YFL and YRL on the side of the left-hand and right-hand front wheels 2FL and 2FR, i.e. YFL+YFR. The roll component operating section 52 is to operate the roll component of the vehicle body by adding the difference of the vehicle height displacement velocity signals YRL and YRR on the rear wheel side, i.e. YRL−YRR, to the difference of the vehicle height displacement velocity signals YFL and YFR on the front wheel side, i.e. YFL−YFR.

In the vehicle-height displacement velocity control system B, the pitch component calculated by the pitch component operating section 51 is inputted into the pitch control section 53 and a control amount for controlling the flow rate to each proportional flow rate control valve 9 for controlling the pitch component is operated on the basis of a gain KP2. On the other hand, the roll component calculated by the roll component operating section 52 is inputted into the roll control section 54 and a control amount for controlling the flow rate to each proportional flow rate control valve 9 is operated to reach the vehicle height of the vehicle body so as to correspond to a target roll amount TR on the basis of gains KRF2 and KRR2.

The sign plus or minus of each of the control amounts for each wheel produced by the respective pitch control sections 53 and 54 is inverted into the opposite sign. In other words, the vehicle height displacement velocity signals YFR, YFL, YRR and YRL operated by the differentiators 50a, 50b, 50c and 50d are processed so as to reverse their signs plus or minus into their opposite signs. Then, the resulting pitch and roll control amounts for each of the wheels 2FL, 2FR, 2RL and 2RR are added, thereby giving flow rate operating signals QFL2c, QFR2c, QRL2c, and QRR2c, respectively, in the control system B.

The resulting flow rate operating signals QFL2c, QFR2c, QRL2c, and QRR2c, are inputted into flow rate filters 55a, 55b, 55c and 55d, respectively. The flow rate filters 55a, 55b, 55c and 55d have each a filter constant as represented by:

$$1/(1 + k \times Qo \times S)$$

where
Qo is set to a value equal to the flow rate operating signal QFL2c, QFR2c, QRL2c or QRR2c when the flow rate operating signal QFL2c, QFR2c, QRL2c or QRR2c, respectively, is smaller than a predetermined value W2, on the one hand, and to a value equal to the predetermined value W2 when the flow rate operating signal QFL2c, QFR2c, QRL2c or QRR2c is equal to or larger than the predetermined value W2, on the other hand;
k is a constant; and
S is a Laplace's operator which gives a larger value as the frequency of vibration gets larger.

Hence, the filter constant becomes a smaller value as the frequency of vibration applied to the vehicle body gets larger, when each of the flow rate operating signals QFL2c, QFR2c, QRL2c, and QRR2c is smaller than the predetermined value W2 and when each of the flow rate operating signals QFL2c, QFR2c, QRL2c, and QRR2c gets larger. As a result, flow rate signals QFL2, QFR2, QRL2, and QRR2 to be generated to the respective proportional flow rate control valves 9 from the flow rate filters 55a, 55b, 55c and 55d become so small that an oscillating phenomenon can be prevented which may occur due to the fact that the flow rate signals QFL2, QFR2, QRL2, and QRR2 get larger, i.e. that a flow velocity of the fluid, or oil, gets higher. Further, since Qo is set to a value equal to the predetermined value W2 when the flow rate operating signals QFL2c, QFR2c, QRL2c, and QRR2c are equal to or larger than the predetermined value W2, the filter constant is determined exclusively by the Laplace's operator S when the flow rate operating signals QFL2c, QFR2c, QRL2c, and QRR2c are equal to or larger than the predetermined value W2. Since the filter constant does not become so small when vibration having a large amplitude is applied to the vehicle body in such a manner that a low-frequency vibration which should be subjected to suspension control accompanies a high-frequency vibration, the suspension control of such vibration can be performed in a desired degree of control sensitivity.

The vertical vibration control system C comprises a bounce component operating section 61, a pitch component operating section 62, and a roll component operating section 63. The vertical acceleration detecting signals GFR, GFL and GR detected by the vertical acceleration sensors 15, 15 and 15 from which the high-frequency components have been removed by the respective low pass filters 60a, 60b and 60c, are supplied to the bounce component operating section 61 which in turn is to give the bounce component of the vehicle body by adding vertical acceleration detecting signals GFL, GFR and GR for detecting acceleration in the vertical direction, detected by the respective vertical acceleration sensors 15, 15 and 15. The pitch component operating section 62 is to determine the pitch component of the vehicle body by subtracting output GR of the vertical acceleration sensor 15 located in a central portion in the widthwise direction between the left-hand and right-hand rear wheels from a half of the sum of the outputs GFR+GFL, i.e. (GFR+GFL)/2, from the vertical acceleration sensors 15 and 15 located in the positions above the respectively right-hand and left-hand front wheels. The roll component operating section 63 is to determine the roll component of the vehicle body by subtracting the output GFL from the vertical acceleration sensor 15 located on the left-hand front wheel side from the output GFR from the vertical acceleration sensor 15 located on the right-hand front wheel side.

The vertical acceleration control system C is further provided with a bounce control section 64, a pitch control section 65 and a roll control section 66. The bounce control section 64 is given the operated value of the bounce component operated by the bounce component operating section 61, thereby giving a control amount for controlling the fluid to be supplied to each proportional flow rate control valve 9 on the basis of a gain KB3 for controlling the bounce component. The operated value of the pitch component operated by the pitch component operating section 62 is inputted into the pitch control section 65 and a control amount of the fluid to be supplied to each proportional flow rate control valve 9 for controlling the pitch component is given on the basis of a gain KP3. The operated value of the roll component operated by the roll component operating section 63 is inputted into the roll control section 66, thereby giving a control amount of the fluid to be supplied to each proportional flow rate control valve 9 on the basis of gains KRF3 and KRR3 for controlling the pitch component.

The control amounts calculated by the bounce control section 64, the pitch control section 65 and the roll control section 66 in the manner as described hereinabove are then processed to reverse their signs plus or minus into their opposite signs for each wheel. Then, each of the control amounts for each corresponding wheel is added, thereby giving flow rate operating signals QFL3c, QFR3c, QRL3c, and QRR3c in the control system C.

Blind section units 67a, 67b and 67c are interposed, respectively, between the low pass filter 60a for cutting the high-frequency component out and the bounce component operating section 61, between the low pass filter 60b for cutting the high-frequency component out and the pitch component operating section 62, and between the low pass filter 60c for cutting the high-frequency component out and the roll component operating section 63. The vertical acceleration signal GFR is inputted through the low pass filter 60a from the vertical acceleration sensor 15 is fed to the bounce component operating section 61, the pitch component operating section 62 and the roll component operating section 63 only when the vertical acceleration signal GFR surpasses the blind section XG. Likewise, the vertical acceleration signal GFL inputted through the low pass filter 60b from the vertical acceleration sensor 15 is fed to the bounce, pitch and roll component operating sections 61, 62 and 63 only when the signal GFL surpasses the blind section XG. Further, the vertical acceleration signal GR inputted through the low pass filter 60c from the vertical acceleration sensor 15 is fed to the bounce, pitch and roll component operating sections 61, 62 and 63 only when the signal GR surpasses the blind section XG.

The resulting flow rate operating signals QFL3c, QFR3c, QRL3c, and QRR3c, are inputted into flow rate filters 68a, 68b, 68c and 68d, respectively. The flow rate filters 68a, 68b, 68c and 68d have each a filter constant as represented by:

$$1/(1 + k \times Q_o \times S)$$

where

Qo is set to a value equal to the flow rate operating signal QFL3c, QFR3c, QRL3c or QRR3c when the flow rate operating signal QFL3c, QFR3c, QRL3c or QRR3c, respectively, is smaller than a predetermined value W3, on the one hand, and to a value equal to the predetermined value W3 when the flow rate operating signal QFL3c, QFR3c, QRL3c or QRR3c is equal to or larger than the predetermined value W3, on the other hand;

k is a constant; and

S is a Laplace's operator which gives a larger value as the frequency of vibration gets larger.

Hence, the filter constant becomes a smaller value as the frequency of vibration applied to the vehicle body gets larger, when each of the flow rate operating signals QFL3c, QFR3c, QRL3c, and QRR3c is smaller than the predetermined value W3 and when each of the flow rate operating signals QFL3c, QFR3c, QRL3c and QRR3c gets larger. As a result, flow rate signals QFL3, QFR3, QRL3, and QRR3 to be generated to the respective proportional flow rate control valves 9 from the flow rate filters 68a, 68b, 68c and 68d become so small that an oscillating phenomenon can be prevented which may occur due to the fact that the flow rate signals QFL3, QFR3, QRL3, and QRR3 get larger, i.e. that a flow velocity of the fluid, or oil, gets higher. Further, since Qo is set to be equal to the predetermined value W3 when the flow rate operating signals QFL3c, QFR3c, QRL3c, and QRR3c are equal to or larger than the predetermined value W3, the filter constant is determined exclusively by the Laplace's operator S when the flow rate operating signal QFL3c, QFR3c, QRL3c or QRR3c is equal to or larger than the predetermined value W3. Since the filter constant does not become so small when vibration having a large amplitude is applied to the vehicle body in such a manner that a low-frequency vibration which should be subjected to suspension control accompanies a high-frequency vibration, the suspension control of such vibration can be performed in a desired degree of sensitivity to control.

The control system D for eliminating the twist of the vehicle body comprises a warp control section 71 consisting of a front wheel liquid pressure ratio operating section 71a for operating a ratio of liquid pressure on the front wheel side and a rear wheel liquid pressure ratio operating section 71b for operating a ratio of liquid pressure on the rear wheel side. The liquid pressure detecting signals PFL and PFR detected by the liquid pressure sensors 13 and 13 for the fluid cylinder units 3 and 3 on the left-hand and right-hand front wheels 2FL and 2FR are inputted into low pass filters 70a and 70b, respectively, and the high-frequency components are cut out of the signals PFL and PFR by the respective low pass filters 70a and 70b. Thereafter, the resulting outputs PFL and PFR are inputted into the front wheel liquid pressure ratio operating section 71a which in turn gives a liquid pressure ratio Pf of the difference between the signals PFR and PFL of the respective liquid pressure chambers 3c and 3c of the fluid cylinder units 3 and 3 for the right-hand and left-hand front wheels 2FR and 2FL to the sum of the liquid pressure signals PFR and PFL, i.e. Pf=(PFR−PFL)/(PFR+PFL). Further, the front wheel liquid pressure ratio operating section 71a generates the resulting liquid pressure ratio Pf as it is when the resulting liquid pressure ratio Pf is larger than a threshold liquid pressure ratio −ωL yet smaller than +ωL, on the one hand, and it generates the threshold liquid pressure ratio −ωL or +ωL when the liquid pressure ratio Pf is smaller than −ωL or when it is larger than +ωL, on the other hand. Likewise, the liquid pressure detecting signals PRL and PRR detected by the liquid pressure sensors 13 and 13 for the fluid cylinder units 3 and 3 on the left-hand and right-hand rear wheels 2RL and 2RR are inputted into low pass filters 70c and 70d, respectively, and the high-frequency components are cut out of the signals PRL and PRR by the respective low pass filters 70c and 70d. Thereafter, the resulting outputs PRL and PRR are inputted into the rear wheel liquid pressure ratio operating section 71a which in turn gives a liquid pressure ratio Pr of the difference between the signals PRR and PRL of the respective liquid pressure chambers 3c and 3c of the fluid cylinder units 3 and 3 for the right-hand and left-hand rear wheels 2RR and 2RL to the sum of the liquid pressure signals PRR and PRL, i.e. Pr=(PRR−PRL)/(PRR+PRL). The warp control section 71 multiplies the liquid pressure ratio Pr on the rear wheel side to predetermined times using a gain ωF and then subtracts the resulting product from the liquid pressure ratio Pf on the front wheel side. Further, the output from the warp control section 71 is multiplied to predetermined times by using a gain ωA. Thereafter, the output on the front wheel side multiplied by using the gain ωA is further multiplied to predetermined times by using a gain ωC. Then, the resulting control amount of the fluid to be supplied to each wheel is processed so as to cause its sign plus or minus to be opposite to each other between the left-hand and right-hand wheels, thereby giving flow rate signals QFL4, QFR4, QRL4, and QRR4.

In the transverse acceleration control system E, the transverse acceleration detecting signal GL, indicative of acceleration in the transverse direction of the vehicle body, detected by the transverse acceleration sensor 16, is inputted into a low pass filter 80 and the high-frequency component is cut out of the transverse acceleration detecting signal GL by the low pass filter 80, followed by operating a control amount on the basis of a gain Kg. The control amounts for the left-hand and right-hand front wheels 2FL and 2FR are further multiplied to predetermined times on the basis of a gain AGF. Thereafter, the control amount of the fluid to be supplied to the left-hand front wheel 2FL is treated so as to reverse its sign plus or minus into its opposite sign, thereby reversing the signs of the control amounts of the fluid to be supplied to the left-hand and right-hand front wheels from each other. For the left-hand and right-hand rear wheels 2RL and 2RR, on the other hand, the sign plus or minus of the control amount of the fluid to be supplied to the left-hand rear wheel 2RL is reversed into its opposite sign so as to reverse the signs of the control amounts of the fluid to be supplied to the left-hand and right-hand rear wheels from each other. As a result, there are provided flow rate operating signals, thereby giving flow rate signals QFL5c, QFR5c, QRL5c, and QRR5c for the transverse acceleration control system E.

The resulting flow rate operating signals QFL5c, QFR5c, QRL5c, and QRR5c, are inputted into flow rate filters 81a, 81b, 81c and 81d, respectively. The flow rate filters 81a, 81b, 81c and 81d have each a filter constant as represented by:

$$1/(1+k \times Q_o \times S)$$

where $Q_o$ is set to a value equal to the flow rate operating signal QFL5c, QFR5c, QRL5c or QRR5c when the flow rate operating signal QFL5c, QFR5c, QRL5c or QRR5c, respectively, is smaller than a predetermined value W5, on the one hand, and to a value equal to the predetermined value W5 when the flow rate operating signal QFL5c, QFR5c, QRL5c or QRR5c is equal to or larger than the predetermined value W5, on the other hand;

k is a constant; and

S is a Laplace's operator which gives a larger value as the frequency of vibration gets larger.

Hence, the filter constant becomes a smaller value as the frequency of vibration applied to the vehicle body gets larger, when the flow rate operating signals QFL5c, QFR5c, QRL5c, and QRR5c are smaller than the predetermined value W5 and when the flow rate operating signals QFL5c, QFR5c, QRL5c, and QRR5c get larger. As a result, flow rate signals QFL5, QFR5, QRL5, and QRR5 to be generated to the respective proportional flow rate control valves 9 from the flow rate filters 81a, 81b, 81c and 81d become so small that an oscillating phenomenon can be prevented which may occur due to the fact that the flow rate signals QFL5, QFR5, QRL5, and QRR5 get larger, i.e. that a flow velocity of the fluid, or oil, gets higher. Further, since $Q_o$ is set to be equal to the predetermined value W5 when the flow rate operating signals QFL5c, QFR5c, QRL5c, and QRR5c are equal to or larger than the predetermined value W5, the filter constant is determined exclusively by the Laplace's operator S when the flow rate operating signals QFL5c, QFR5c, QRL5c, and QRR5c are equal to or larger than the predetermined value W5. Since the filter constant does not become so small when vibration having a large amplitude is applied to the vehicle body in such a manner that a low-frequency vibration which should be subjected to suspension control accompanies a high-frequency vibration, the suspension control of such vibration can be performed in a desired degree of sensitivity to control.

The flow rate signals for controlling the flow rate to each proportional flow rate control valve 9 in the control systems A, B, C, D and E are added for each wheel, and the flow rate signals for the left-hand and right-hand front wheels 2FL and 2FR are 2FR are further multiplied by a gain AF, thereby giving total flow rate signals QFR, QFL, QRR and QRL for supplying the fluid to each proportional flow rate control valve 9 for the respective wheels.

3c of the fluid cylinder unit 3 and it is so set as not to cause the pressure within the liquid pressure chamber 3c

TABLE

| Control Gain | Modes | | | | | | | Unit |
|---|---|---|---|---|---|---|---|---|
| | 1 | 2 | 3 | 4 | 5 | 6 | 7 | |
| KB1 | 0.02 | 0.02 | 0.02 | 0.02 | 0.02 | 0.02 | 0.02 | L/mm |
| KP1 | 0.02 | 0.02 | 0.02 | 0.02 | 0.02 | 0.02 | 0.02 | L/mm |
| KRF1 | 0.04 | 0.04 | 0.04 | 0.04 | 0.04 | 0.04 | 0.04 | L/mm |
| KRR1 | 0 | 0 | 0 | 0 | 0 | 0 | 0 | L/mm |
| KP2 | 0 | 0.05 | 0 | 0 | 0 | 0 | 0 | L/(mm/sec) |
| KRF2 | 0 | 0 | 0 | 0.03 | 0.05 | 0.05 | 0.07 | L/(mm/sec) |
| KRR2 | 0 | 0 | 0 | 0.03 | 0.05 | 0.05 | 0.07 | L/(mm/sec) |
| KB3 | 5 | 20 | 10 | 12 | 15 | 15 | 15 | L/G |
| KP3 | 5 | 20 | 10 | 12 | 15 | 15 | 15 | L/G |
| KRF3 | 5 | 15 | 15 | 20 | 20 | 30 | 40 | L/G |
| KRR3 | 5 | 15 | 15 | 20 | 20 | 30 | 40 | L/G |
| Kg | 0 | 0 | 0 | 5 | 10 | 15 | 20 | L/G |
| AGF | 0 | 0 | 0 | 1 | 1.05 | 1.1 | 1.15 | — |
| ωA | 250 | 250 | 250 | 250 | 250 | 350 | 350 | — |
| ωF | 1 | 1 | 1 | 1 | 1 | 1.2 | 1.2 | — |
| ωL | 0.5 | 0.5 | 0.5 | 0.5 | 0.5 | 0.5 | 0.5 | — |
| ωC | 1 | 1 | 1 | 1 | 1 | 1 | 1 | — |
| XH | 5 | 1 | 1 | 1 | 1 | 5 | 5 | mm |
| XG | 0.05 | 0 | 0 | 0 | 0 | 0 | 0 | G |
| AF | 1 | 1 | 1 | 1 | 1.05 | 1.1 | 1.15 | — |
| Qmax | 5 | 15 | 15 | 15 | 15 | 15 | 15 | L |
| Pmax | 110 | 110 | 110 | 110 | 110 | 110 | 110 | Kgf/cm$^2$ |
| Pmin | 30 | 30 | 30 | 30 | 30 | 30 | 30 | Kgf/cm$^2$ |
| TH | 0 | 0 | 0 | 0 | 0 | 0 | 0 | mm |
| TR | 0 | 0 | 0 | 10 | 0 | 5 | 3 | mm |

Note:
L = liter/minute

In Table above, Mode 1 refers to a value of each control gain for 60 seconds after the combustion engine 30 has been stopped; Mode 2 refers to a value of each control gain in such a state that an ignition switch is turned on yet the vehicle speed is zero; Mode 3 refers to a value of each control gain selected when the vehicle speed is equal to 40 kilometers per hour or slower; Mode 4 refers to a value of each control gain in a reverse roll mode selected by a roll-mode selecting switch (not shown) when the vehicle speed is faster than 30 kilometers per hour yet equal to or slower than 60 kilometers per hour and when the automotive vehicle is cornering slowly at the transverse acceleration GL as low as 0.3 or lower, however, Mode 4 is so arranged as to be switched automatically to Mode 3, 5 or 6 even if the reverse roll mode is chosen when the vehicle speed and the transverse acceleration GL are outside the above ranges; Mode 5 refers to a value of each control gain in a state that the automotive vehicle is cornering slowly at an intermediate vehicle speed as high as faster than 40 kilometers per hour but equal to or slower than 80 kilometers per hour and at the transverse acceleration GL as high as 0.2 or lower; Mode 6 refers to a value of each control gain in a state that the automotive vehicle is cornering at an intermediate vehicle speed as high as faster than 40 kilometers per hour but equal to or slower than 80 kilometers per hour and at the intermediate or high transverse acceleration GL as high as higher than 0.2; and Mode 7 refers to a value of each control gain when the automotive vehicle is travelling at a high speed exceeding 80 kilometers per hour. The control gain Qmax denotes a maximum control amount of the fluid to be supplied to the proportional flow rate control valve 9 for each wheel, and the control gain Pmax denotes a maximum pressure within the liquid pressure chamber 3c of the fluid cylinder unit 3 and it is so set as for the fluid to cause no backward flow from the liquid pressure chamber 3c of the fluid cylinder unit 3 into the accumulator 22, while the control gain Pmin stands for a minimum pressure within the liquid pressure chamber 3c of the fluid cylinder unit 3 and it is so set as not to cause the pressure within the liquid pressure chamber 3c of the fluid cylinder unit 3 to be reduced to an excessive extent, thereby causing no gas spring 5 to be extended to an excessive extent and to be broken.

In Table above, it is to be noted that each of the control gains is so set as to perform the suspension control which stresses pays more emphasis upon travelling stability as the mode number gets larger except Mode 4.

For the suspension apparatus according to the present invention, the flow rate signal to be fed to each proportional flow rate control valve 9 is determined by inputting the corresponding flow rate operating signals into the flow rate filters 55a to 55d, 68a to 68d and 81a to 81d and each of the flow rate operating signals in the control systems B, C and E has the filter constant as represented by $1/(1+k \times Qo \times S)$ wherein Qo is set to be equal to the flow rate operating signal when it is lower than the predetermined value W2, W3 or W5, on the one hand, and Qo is set to be the predetermined value W2, W3 or W5 when it is equal to or larger than the predetermined value W2, W3 or W5, on the other hand. Hence, it is possible to effectively prevent an oscillating phenomenon from occurring due to a large flow rate signal and a high speed of the flow of oil by setting the predetermined value W2, W3 and W5 to a desired value. Further, it is possible to perform the suspension control over a low-frequency vibration having a large amplitude accompanying a high-frequency vibration in a desired way without a decrease in control sensitivity.

It is to be understood as a matter of course that the present invention is construed as being not limitative to the embodiments as described hereinabove but encompassing various changes and modifications within the spirit and the scope of the invention.

For instance, although the foregoing embodiments refer to the suspension apparatus having the gas spring 5, it is understood that the present invention can be applied to a so-called active suspension apparatus without any gas spring 5. Flow rate filters 91a to 91d, inclusive, may be disposed in the control system A, while flow rate filters 92a to 92d, inclusive, may be disposed in the control system D.

Further, the embodiments as described hereinabove contain the control systems A, B, C, D and E, however, at least either one of the control systems B, C, D or E is needed in addition to the control system A. Although the flow rate filter is disposed only in the control systems B, C and E, it may be disposed in the control system A and/or the control system D, too.

It is further to be noted that each of the means does not necessarily refer to physical one and that the present invention is construed as encompassing the case where the function of each means can be realized by software means or where the functions of the plural means can be realized by one physical means or where the function of one means can be realized by plural physical means.

The present invention may be embodied in other specific forms without departing from the spirit and scope thereof. The present embodiments as described hereinabove are therefore to be considered in all respects as illustrative and not restrictive, the scope of the invention being indicated by the appended claims, and all the changes, modifications and variations which come within the meaning and range of equivalency of the claims are therefore intended to be encompassed within the spirit and scope of the invention.

What is claimed is:

1. A suspension apparatus for an automotive vehicle having a fluid cylinder unit disposed between a vehicle body of the automotive vehicle and each wheel and having an actuator for supplying and discharging operating fluid to and from the fluid cylinder unit disposed so as to control suspension characteristics, comprising:
    travelling-state detecting means for detecting a travelling state of the automotive vehicle;
    control means for determining a control amount for the actuator on the basis of a predetermined condition in response to a signal detected by and generated from the travelling-state detecting means; and
    filter means for decreasing a gain of the control amount determined by the control means in a larger amount as frequency of vibration gets larger; and
    wherein a time constant of the filter means becomes larger as the control amount gets larger when the control amount determined by the control means is smaller than a predetermined value and the time constant is set to the predetermined value when the control amount determined by the control means is equal to or larger than the predetermined value.

2. A suspension apparatus as claimed in claim 1, wherein:
    the travelling-state detecting means is vehicle height detecting means for detecting a vehicle height at each of the wheels separately and independently from each other; and
    the control means is to determine the control amount in such a manner that an actual posture of the automotive vehicle obtained on the basis of a vehicle height signal indicative of the vehicle height detected by the vehicle height detecting means at each of the wheels becomes a predetermined posture thereof.

3. A suspension apparatus as claimed in claim 2, wherein:
    the actual posture obtained on the basis of the vehicle height signal from the vehicle height detecting means at each of the wheels is determined by three components consisting of a bounce component, a pitch component and a roll component; and
    the control means is to determine the control amount for each of the three components.

4. A suspension apparatus as claimed in claim 1, wherein:
    the travelling-state detecting means is vehicle-height displacement velocity detecting means for detecting a velocity of displacing a vehicle height at each of the wheels separately and independently from each other; and
    the control means is to determine the control amount so as to suppress the velocity of displacing the vehicle height detected by the vehicle-height displacement velocity detecting means at each of the wheels.

5. A suspension apparatus as claimed in claim 4, wherein:
    a velocity of displacing the vehicle height with respect to two components consisting of a pitch component and a roll component is determined on the basis of a signal indicative of the velocity of displacing the vehicle height from the vehicle-height displacement velocity detecting means; and
    the control means is to determine the control amount for each of the two components.

6. A suspension apparatus as claimed in claim 1, wherein:
    the travelling-state detecting means is vertical acceleration detecting means for detecting vertical acceleration acting upon the vehicle body in a vertical direction; and
    the control means is to determine the control amount so as to suppress the vertical acceleration detected by the vertical acceleration detecting means.

7. A suspension apparatus as claimed in claim 6, wherein:
    the vertical acceleration detecting means is disposed at least in three positions of the vehicle body;
    the vertical acceleration is determined with respect to three components of vibration consisting of a bounce component, a pitch component and a roll component on the basis of a signal indicative of the vertical acceleration from each of the vertical acceleration detecting means; and
    the control means is to determine the control amount for each of the three components.

8. A suspension apparatus as claimed in claim 1, wherein:
    the travelling-state detecting means is twist detecting means for detecting a twist between a front portion and a rear portion of the vehicle body; and
    the control means is to determine the control amount so as to suppress the twist detected by the twist detecting means.

9. A suspension apparatus as claimed in claim 1, wherein:
    the travelling-state detecting means is transverse acceleration detecting means for detecting transverse acceleration acting upon the vehicle body in a transverse direction; and
    the control means is to determine the control amount so as to suppress the transverse acceleration detected by the transverse acceleration detecting means.

10. A suspension apparatus as claimed in claim 1, wherein a signal Q indicative of the control amount to the actuator from the control means is determined by the following formula:

$$Q = Qc/(1 + k \times Qo \times S)$$

where
Qc is a control amount operated by the control means;
k is a constant;
S is a Laplace's operator so arranged as to become larger as the frequency of vibration gets larger; and
Qo is a time constant set to a value equal to Qc when Qc is lower than a predetermined value W, on the one hand, and to the predetermined value W when Qc is equal to or larger than the predetermined value W.

11. A suspension apparatus as claimed in claim 1, wherein:
the control means comprises a first control means and a second control means and the control amount comprises a first control amount and a second control amount;
the travelling-state detecting means comprises vehicle height detecting means for detecting a vehicle height at each of the wheels separately and independently from each other and vehicle-height displacement velocity detecting means for detecting a velocity of displacing a vehicle height at each of the wheels separately and independently from each other;
the first control means is for determining the first control amount in such a manner that an actual posture of the automotive vehicle obtained on the basis of a vehicle height signal indicative of the vehicle height detected by the vehicle height detecting means at each of the wheels becomes a predetermined posture thereof and the second control means is for determining the second control amount so as to suppress the velocity of displacing the vehicle height detected by the vehicle-height displacement velocity detecting means at each of the wheels; and
the filter means is so set as to act upon the second control amount only out of the first and second control amounts.

12. A suspension apparatus as claimed in claim 11, wherein:
the actual posture is determined by three components consisting of a bounce component, a pitch component and a roll component and the first control means is to determine the first control amount for each of the three components; and
the velocity of displacing the vehicle height is determined with respect to two components consisting of the pitch component and the roll component and the second control means is to determine the second control amount for each of the two components.

13. A suspension apparatus as claimed in claim 11, wherein the control amount to the actuator is the sum of the first control amount and the second control amount.

14. A suspension apparatus as claimed in claim 1, wherein:
the control means comprises a first control means and a third control means and the control amount comprises a first control amount and a third control amount;
the travelling-state detecting means comprises vehicle height detecting means for detecting a vehicle height at each of the wheels separately and independently from each other and vertical acceleration detecting means for detecting vertical acceleration acting upon the vehicle body in a vertical direction;
the first control means is for determining the first control amount in such a manner that an actual posture of the automotive vehicle obtained on the basis of a vehicle height signal indicative of the vehicle height detected by the vehicle height detecting means at each of the wheels becomes a predetermined posture thereof and the third control means is to determine the third control amount so as to suppress the vertical acceleration detected by the vertical acceleration detecting means; and
the filter means is so set as to act upon the third control amount only out of the first and third control amounts.

15. A suspension apparatus as claimed in claim 14, wherein:
the actual posture is determined by three components consisting of a bounce component, a pitch component and a roll component and the first control means is to determine the first control amount for each of the three components; and
the vertical acceleration detecting means is disposed at least in three positions of the vehicle body, the vertical acceleration is determined with respect to three components of vibration consisting of a bounce component, a pitch component and a roll component; and the third control means is to determine the third control amount for each of the three components so as to suppress each of the three components of vertical acceleration.

16. A suspension apparatus as claimed in claim 14, wherein the control amount to the actuator is the sum of the first control amount and the third control amount.

17. A suspension apparatus as claimed in claim 1, wherein:
the control means comprises a first control means, a second control means and a third control means and the control amount comprises a first control amount, a second control amount and a third control amount;
the travelling-state detecting means comprises vehicle height detecting means for detecting a vehicle height at each of the wheels separately and independently from each other, vehicle-height displacement velocity detecting means for detecting a velocity of displacing a vehicle height at each of the wheels separately and independently from each other, and vertical acceleration detecting means for detecting vertical acceleration acting upon the vehicle body in the vertical direction;
the first control means is for determining the first control amount in such a manner that an actual posture of the automotive vehicle obtained on the basis of a vehicle height signal indicative of the vehicle height detected by the vehicle height detecting means at each of the wheels becomes a predetermined posture thereof, the second control means is for determining the second control amount so as to suppress the velocity of displacing the vehicle height detected by the vehicle-height displacement velocity detecting means, and the third control means is for determining the third control amount so as to suppress the vertical acceleration detected by the vertical acceleration detecting means; and the filter means is so set as to act upon at least one of the second control amount and the third control amount.

18. A suspension apparatus as claimed in claim 17, wherein:

the actual posture is determined by three components consisting of a bounce component, a pitch component and a roll component and the first control means is to determine the first control amount for each of the three components;

the velocity of displacing the vehicle height is determined with respect to two components consisting of the pitch component and the roll component and the second control means is to determine the second control amount for each of the two components; and the vertical acceleration detecting means is disposed at least in three positions of the vehicle body, the vertical acceleration is determined with respect to three components of vibration consisting of the bounce component, the pitch component and the roll component; and the third control means is to determine the third control amount for each of the three components so as to suppress each of the three components of vertical acceleration.

19. A suspension apparatus as claimed in claim 17, wherein the control amount to the actuator is the sum of the first control amount, the second control amount and the third control amount.

20. A suspension apparatus as claimed in claim 17, wherein:

the control means further comprises a fifth control means and the control amount further comprises a fifth control amount;

the travelling-state detecting means further comprises transverse acceleration detecting means for detecting transverse acceleration acting upon the vehicle body; and the fifth control means is for determining the fifth control amount so as to suppress the transverse acceleration detected by the transverse acceleration detecting means.

21. A suspension apparatus as claimed in claim 20, wherein:

the control means further comprises a fourth control means and the control amount further comprises a fourth control amount;

the travelling-state detecting means further comprises twist detecting means for detecting a twist between a front portion and a rear portion of the vehicle body; and the fourth control means is for determining the fourth control amount so as to suppress the twist detected by the twist detecting means.

22. A suspension apparatus as claimed in claim 21, wherein the filter means is so set as to act upon the second control amount, the third control amount and the fifth control amount only out of the first, second, third, fourth and fifth control amounts.

23. A suspension apparatus as claimed in claim 21, wherein the control amount to the actuator is the sum of the first, second, third, fourth and fifth control amounts.

24. A suspension apparatus as claimed in claim 17, wherein the vehicle-height displacement velocity-detecting means calculates the velocity of displacing the vehicle height by differentiating the vehicle height detected by the vehicle height detecting means.

25. A suspension apparatus as claimed in claim 1, wherein:

the control means comprises a first control means and a fifth control means and the control amount comprises a first control amount and a fifth control amount;

the travelling-state detecting means comprises vehicle height detecting means for detecting a vehicle height at each of the wheels separately and independently from each other and transverse acceleration detecting means for detecting transverse acceleration acting upon the vehicle body in a transverse direction;

the first control means is for determining the first control amount in such a manner that an actual posture of the automotive vehicle obtained on the basis of a vehicle height signal indicative of the vehicle height detected by the vehicle height detecting means becomes a predetermined posture thereof and the fifth control means is to determine the fifth control amount so as to suppress the transverse acceleration detected by the transverse acceleration detecting means; and the filter means is so set as to act upon the fifth control amount only out of the first and fifth control amounts.

26. A suspension apparatus as claimed in claim 1, wherein:

the actuator is a flow rate control valve; and the control amount is determined as a signal indicative of a flow rate for supplying or discharging operating fluid to and from the flow rate control valve.

27. A suspension apparatus as claimed in any one of claims 11 to 26, wherein a signal Q indicative of the control amount to be outputted from the control means is determined by the following formula:

$$Q = Q_c/(1 + k \times Q_o \times S)$$

where $Q_c$ is a control amount operated by the control means;

$k$ is a constant;

$S$ is a Laplace's operator so arranged as to become larger as the frequency of vibration gets larger; and $Q_o$ is a time constant set to a value equal to $Q_c$ when $Q_c$ is lower than a predetermined value W, on the one hand, and to the predetermined value W when $Q_c$ is equal to or larger than the predetermined value W.

* * * * *